FERDINAND TELLGMANN, OF STAMFORD, CONNECTICUT.

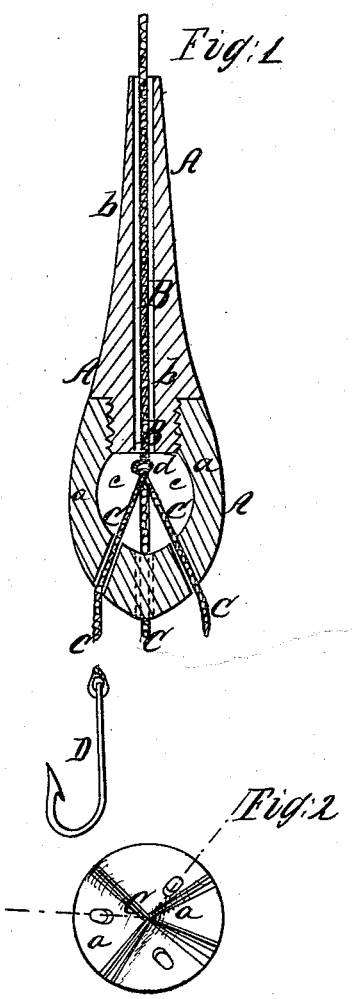

Letters Patent No. 86,786, dated February 9, 1869.

IMPROVEMENT IN FISHING-TACKLE.

The Schedule referred to in these Letters Patent and making part of the same.

*To all whom it may concern:*

Be it known that I, FERDINAND TELLGMANN, of Stamford, in the county of Fairfield, and State of Connecticut, have invented a new and useful Improvement in Fishing-Tackle; and I do hereby declare that the following is a full, clear, and exact description thereof, which will enable others skilled in the art to make and use the same, reference being had to the accompanying drawings, forming part of this specification, in which—

Figure 1 represents a vertical sectional view of my improved sinker-attachment to fishing-tackle.

Figure 2 is an end view of the same.

Similar letters of reference indicate like parts.

This invention relates to a new sinker-attachment for fishing-tackle, and consists in the use of a hollow sectional sinker, which is so arranged that it will be without corners, projecting flanges, and such devices, which might serve to retain it on the ground.

The knots formed at the junction of the hand-line with the hook-cords are all concealed within the hollow-sinker, and can, therefore, not be caught by projecting stones, shells, or other obstructions.

The main object of this invention is to produce a sinker which will contain the knot, and which will itself be of such shape as not to be easily detained on the ground.

A, in the drawings, represents the sinker, made of suitable metal, or other material. It is composed of two sections, $a$ and $b$, the lower section, $a$, being cup-shaped, while the upper part, $b$, is tubular. Both sections can be screwed together, as in fig. 1, or can be connected in any other suitable manner.

B is the main line.

C C are the cords to which the hooks D D are attached.

The cords C are tied to B within a cavity, $c$, formed in the sinker A, the knot $d$, formed thereby, being fully concealed, said knot resting against the lower end of $b$, as in fig. 1.

The cords C C pass through perforations in the lower part of the cap, $a$.

The lower end of the sinker is pointed or rounded, and no prominent corners or edges are formed thereon.

Having thus described my invention,

I claim as new, and desire to secure by Letters Patent—

A sectional sinker, A, consisting of two parts, $a$ $b$ and containing a cavity, $c$, substantially as herein shown and described, for the purpose set forth.

FERDINAND TELLGMANN.

Witnesses:
EDWIN SCOFIELD, Jr.,
OSCAR SHERWOOD.